(12) United States Patent
Van Acht et al.

(10) Patent No.: US 10,684,779 B2
(45) Date of Patent: Jun. 16, 2020

(54) MEMORY ACCESS UNIT FOR PROVIDING ACCESS TO AN ITEM FROM AN ARBITRARY LOCATION IN PHYSICAL MEMORY

(71) Applicants: IMEC VZW, Leuven (BE); Stichting IMEC Nederland, Eindhoven (NL)

(72) Inventors: Victor Van Acht, Veldhoven (NL); George Tsouhlarakis, Oud-Heverlee (BE); Mario Konijnenburg, Best (NL); Arjan Breeschoten, Vught (NL)

(73) Assignees: IMEC VZW, Leuven (BE); Stichting IMEC Nederland, Eindhoven (NL)

( * ) Notice: Subject to any disclaimer, the term of this patent is extended or adjusted under 35 U.S.C. 154(b) by 193 days.

(21) Appl. No.: 15/349,307

(22) Filed: Nov. 11, 2016

(65) Prior Publication Data
US 2017/0147210 A1    May 25, 2017

(30) Foreign Application Priority Data
Nov. 24, 2015  (EP) ..................................... 15196102

(51) Int. Cl.
*G06F 3/06* (2006.01)
*G06F 13/16* (2006.01)
(Continued)

(52) U.S. Cl.
CPC ............ *G06F 3/061* (2013.01); *G06F 3/0659* (2013.01); *G06F 3/0685* (2013.01); *G06F 12/0802* (2013.01); *G06F 12/122* (2013.01); *G06F 12/123* (2013.01); *G06F 12/128* (2013.01); *G06F 13/16* (2013.01); *G06F 13/4018* (2013.01); *G06F 2212/1016* (2013.01); *G06F 2212/60* (2013.01)

(58) Field of Classification Search
None
See application file for complete search history.

(56) References Cited

U.S. PATENT DOCUMENTS 4,520,439 A * 5/1985 Liepa ...................... G06F 12/04
                                                          711/201
5,261,077 A    11/1993 Duval et al.
(Continued)

FOREIGN PATENT DOCUMENTS

EP            0 072 927 A2    3/1983

OTHER PUBLICATIONS

European Search Report, European Patent Application No. 15196102. 6, dated Mar. 4, 2016, 5 pages.

*Primary Examiner* — Larry T Mackall
*Assistant Examiner* — Michelle T Bechtold
(74) *Attorney, Agent, or Firm* — McDonnell Boehnen Hulbert & Berghoff LLP

(57) ABSTRACT

The disclosure relates to a memory access unit. One example embodiment is a memory access unit, for providing read-access to read an item from an arbitrary location in a physical memory, independently of addressable locations of the physical memory. The item includes a first number of bits and each addressable location of the physical memory includes a second number of bits. The second number of bits is different from the first number of bits. The memory access unit includes an address input, an address interpreter, an address output, a memory output, a data formatter, and a data output.

17 Claims, 7 Drawing Sheets

(51) Int. Cl.
*G06F 12/123* (2016.01)
*G06F 12/0802* (2016.01)
*G06F 12/122* (2016.01)
*G06F 12/128* (2016.01)
*G06F 13/40* (2006.01)

(56) References Cited

U.S. PATENT DOCUMENTS

| | | | |
|---|---|---|---|
| 5,559,969 A | 9/1996 | Jennings | |
| 5,761,741 A | 6/1998 | Robbins et al. | |
| 5,784,602 A * | 7/1998 | Glass | G06F 9/30014 |
| | | | 712/220 |
| 5,802,399 A | 9/1998 | Yumoto et al. | |
| 5,913,229 A | 6/1999 | Joo | |
| 6,414,609 B1 | 7/2002 | Zukawa et al. | |
| 6,742,063 B1 | 5/2004 | Hellum et al. | |
| 8,504,745 B1 | 8/2013 | Fischaber et al. | |
| 2003/0037201 A1* | 2/2003 | Henry | G06F 12/1054 |
| | | | 711/3 |
| 2004/0168046 A1* | 8/2004 | Teruyama | G06F 9/325 |
| | | | 712/228 |
| 2005/0251630 A1* | 11/2005 | Matthews | G06F 12/0866 |
| | | | 711/138 |
| 2005/0257024 A1* | 11/2005 | Ray | G06F 9/3001 |
| | | | 712/11 |
| 2008/0307167 A1* | 12/2008 | Gunna | G06F 12/0804 |
| | | | 711/143 |
| 2012/0072618 A1* | 3/2012 | Fujimoto | G06F 13/28 |
| | | | 710/24 |
| 2016/0344834 A1* | 11/2016 | Das | H04L 67/2842 |
| 2017/0003967 A1* | 1/2017 | Lin | G06F 9/3017 |
| 2017/0126232 A1* | 5/2017 | Kalte | G11C 7/10 |
| 2018/0267898 A1* | 9/2018 | Henry | G06F 12/0891 |

\* cited by examiner

MEMORY ACCESS UNIT FOR PROVIDING ACCESS TO AN ITEM FROM AN ARBITRARY LOCATION IN PHYSICAL MEMORY

CROSS-REFERENCE TO RELATED APPLICATIONS

The present application is a non-provisional patent application claiming priority to European Patent Application No. EP 15196102.6, filed Nov. 24, 2015, the contents of which are hereby incorporated by reference.

FIELD OF THE DISCLOSURE

The disclosure relates to data storage. In particular, it concerns a system for storing data in a memory, which can make efficient use of the storage capacity of the memory.

BACKGROUND

Microprocessors typically perform operations on 1 bit, 8 bits (1 byte), 16 bits, 32 bits or 64 bits of data. Therefore, microprocessor systems may be designed to allow access to memory in blocks that are also 1, 8, 16, 32, or 64 bits wide.

However, some types of data have a different width. For example, a stream of physical measurements (input) or a stream of generated signals (outputs) may have a width of 4 bits, 12 bits, or 24 bits. Typically, for the sake of simplicity of both hardware and software, 4 bits of data would be stored in an 8-bit memory location, 12 bits data would be stored in a 16-bit memory location and 24 bits would be stored in a 32-bit memory location. The remaining bits at each location are unused, which wastes memory resources.

U.S. Pat. No. 5,559,969 describes a system in which one or more processors have a different data word width from other processors and from a memory device. Data words are concatenated so that the resulting data word matches the word width of the memory device. For example, four 8-bit data words may be concatenated into a 32-bit word, if the word-width of the memory device is 32 bits. Data may be re-ordered (formatted), for example to convert a big-endian data word to a little-endian data word. The system improves storage efficiency when the word width of the memory device is an integer multiple of the data word width. However, U.S. Pat. No. 5,559,969 does not disclose how to store data words in a memory device when the word width of the memory device is not an integer multiple of the data word width.

More efficient storage and retrieval of data of any bit-width in a memory having a given bit-width may prove useful, for example to allow a microprocessor to access the memory in a manner that is transparent to the microprocessor.

SUMMARY

Various aspects of various embodiments are defined by the claims.

According to a first aspect, there is provided a memory access unit, for providing read-access to read an item from an arbitrary location in a physical memory, independently of addressable locations of that physical memory, wherein the item comprises a first number of bits and each addressable location of the physical memory comprises a second number of bits, the second number of bits being different from the first number of bits, the memory access unit comprising:

an address input, for receiving an input memory address identifying the location of the item;

an address interpreter, configured to calculate a physical memory address from the input memory address;

an address output for supplying the physical memory address to an address-input of the physical memory;

a memory input for reading one or more data words from the physical memory, the one or more data words including the item;

a data formatter, configured to extract the item from the one or more data words; and a data output, for outputting the extracted item, wherein the address interpreter is configured to:

obtain a starting address in the physical memory and an item width that may comprise interpreting a first part of the input memory address;

obtain an item number, comprising interpreting a second part of the input memory address; and calculate the physical memory address, based on the starting address, the item number, and the item width, and wherein the data formatter is configured to:

calculate the position of the item within the one or more data words, based on the item number and the item width; and extract the item from the one or more data words at the calculated position.

Such a memory access unit can allow data items of arbitrary width to be stored in the memory, irrespective of the word width in the memory. In example embodiments, the memory access unit can enable "compacted" storage of data in the memory: items of data can be concatenated in the memory with no wasted bits. In general, this means that the items are stored at arbitrary locations in the memory, which are typically not aligned with the boundaries of the data words in the memory. However, because the memory access unit facilitates access to each item of data at each arbitrary location, independently of the addressable words of the physical memory, the compacted storage does not affect the ability to access the items randomly. This contrasts with, for example, buffered storage of a stream of data, which can allow the data to be stored efficiently, but which only permits sequential (rather than random) access to the items in the stream. In some embodiments, the address interpreter and data formatter allow the input address to be mapped to an item in memory in a flexible and efficient manner. The item can be accessed randomly even though there is no one-to-one mapping between input memory addresses and physical memory addresses.

The input memory address may be received from a processor that wishes to access the physical memory. In that case, the memory access unit acts as an intermediary between the processor and the physical memory. The processor may be a microprocessor or a microprocessor core.

In some embodiments, the item consists of the first number of bits and each addressable location of the physical memory consists of the second number of bits.

In some embodiments, the memory access unit is configured to output the extracted item via the data output with a bit-width that is greater than the first number of bits. The output bit-width may be the same as or different from the second number of bits. That is, the item has a bit-width that is equal to the first number of bits; it is stored in a physical memory in one or more data words having a bit width equal to the second number of bits; and it is output (for example, to a processor) with an output bit-width that can be independent of one or both of the first and second number of bits.

This allows items to be stored in a compacted structure in the memory, even though, when they are output to the processor, they are provided in a non-compacted format. The memory access unit may be configured to pad the extracted item with additional bits before outputting the item via the data output.

The data output may comprise a third number of bits that is greater than the first number of bits; and the data formatter is configured to: set the first number of least significant bits of the data output equal to the extracted item; and set the remaining bits of the data output equal to the most significant bit of the extracted item.

In this way, the data formatter performs sign extension of the item, when reading it from the physical memory, by padding the most significant bits of the data output with (copies of) the most significant bit of the item. This may be appropriate when the memory stores signed data (which may be positive or negative numbers) and the system uses the two's-complement representation for negative binary numbers. It allows signed data to be stored in the physical memory in compacted form, while providing it to (for example) a processor in non-compacted form.

According to a second aspect, there is provided a memory access unit, for providing write-access to write an item at an arbitrary location in a physical memory, independently of addressable locations of that physical memory, wherein the item comprises a first number of bits and each addressable location of the physical memory comprises a second number of bits, the second number of bits being different from the first number of bits, the memory access unit comprising:

an address input, for receiving an input memory address identifying the location of the item;

an address interpreter, configured to calculate a physical memory address from the input memory address;

an address output for supplying the physical memory address to an address-input of the physical memory;

a data input, for receiving the item to be written, a data formatter, configured to insert the item in one or more data words suitable for writing to the physical memory; and a memory output, configured to write the one or more data words to the physical memory;

wherein the address interpreter is configured to:

obtain a starting address in the physical memory and an item width that may comprise interpreting a first part of the input memory address;

obtain an item number, comprising interpreting a second part of the input memory address; and calculate the physical memory address, based on the starting address, the item number, and the item width, and wherein the data formatter is configured to:

calculate the position of the item within the one or more data words, based on the item number and the item width; and insert the item into the one or more data words at the calculated position.

Whereas the memory access unit of the first aspect provided read-access to the data in the physical memory, the memory access unit of this aspect provides write-access. The advantages of providing write-access and read-access are similar.

In some embodiments, the memory access unit is configured to receive the item via the data input with a bit-width that is greater than the first number of bits. The input bit-width may be the same as or different from the second number of bits. That is, the item has a bit-width that is equal to the first number of bits; it is stored in a physical memory in one or more data words having a bit width equal to the second number of bits; but it is received (for example, from a processor) with an input bit-width that can be independent of one or both of the first and second number of bits.

This allows items to be stored in a compacted structure in the memory, even though, when they are received from the processor, they are received in a non-compacted format. The memory access unit may be configured to truncate (that is, discard selected bits) of the received item before writing the item to the memory.

In some embodiments, a single memory access unit is configured to provide both read-access and write-access—thereby combining the first aspect and the second aspect.

Accordingly, there is also provided a memory access unit, for providing access to an item at an arbitrary location in a physical memory, independently of addressable locations of that physical memory, wherein the item comprises a first number of bits and each addressable location of the physical memory comprises a second number of bits, the second number of bits being different from the first number of bits, the memory access unit having a read-mode and a write-mode and comprising:

an address input, for receiving an input memory address identifying the location of the item;

an address interpreter, configured to calculate a physical memory address from the input memory address;

an address output for supplying the physical memory address to an address-input of the physical memory;

a memory interface, configured to, in the read-mode, read one or more data words from the physical memory and, in the write-mode, write one or more data words to the physical memory, the one or more data words including the item;

a data formatter, configured to, in the read-mode, extract the item from the one or more data words and, in the write-mode, insert the item in the one or more data words; and a data interface, configured to, in the read-mode, output the extracted item and, in the write-mode, receive the item to be written to the physical memory, wherein the address interpreter is configured to:

obtain a starting address in the physical memory and an item width, that may comprise interpreting a first part of the input memory address;

obtain an item number, comprising interpreting a second part of the input memory address; and calculate the physical memory address, based on the starting address, the item number, and the item width, and wherein the data formatter is configured to:

calculate the position of the item within the one or more data words, based on the item number and the item width; and in the read-mode, extract the item from the one or more data words at the calculated position, and in the write-mode, insert the item into the one or more data words at the calculated position.

The memory access unit of the second aspect may comprise a memory input for reading one or more data words from the physical memory.

In order to write an item consisting of an arbitrary number of bits to memory at an arbitrary location, the memory access unit may first read one or more data words from the memory. The memory access unit may then replace the bits at the arbitrary location with the item to be written and may then write the one or more data words back into the memory. This allows items to be written to locations that are not natively addressable by the memory, without affecting adjacent bits of the data word (or words) in the memory.

The address interpreter may be configured to: detect that the item is located partly in a first data word of the physical memory and partly in a consecutive second data word of the physical memory; calculate a first physical memory address, being the address of the first data word, and calculate a second physical memory address, being the address of the second data word, wherein the memory access unit is configured to: supply the first physical memory address to the physical memory via the address output; read the first data word via the data input; supply the second physical memory address to the physical memory via the address output; and read the second data word via the data input.

In this case, the memory access unit allows access to an item of data that is split across a word boundary. That is, part of the item is stored at the end of the first data word and part of the item is stored at the start of the second data word. The memory access unit can allow access to the item, seamlessly and transparently, without the device that is accessing the data (such as a processor) being aware of the difficulty or adopting any special measures to solve it. In this way, the memory access unit can hide from the processor the details of how the data is organized in the memory.

For a read operation, the data formatter is configured to extract the item from the first data word and the second data word at the calculated position. For a write operation, the data formatter is configured to insert the item into the first data word and the second data word at the calculated position.

Optionally, the first part of the input memory address contains the starting address and the item width.

This can allow the address interpreter to obtain the starting address and item width directly and simply.

Alternatively, the first part of the input memory address may contain a configuration address for obtaining the starting address and the item width.

The configuration address may be smaller in size (that is, it can be represented in fewer bits) than the combined size of the starting address and the item width. In this case, by including a configuration address in the input memory address instead of providing the starting address and item width directly, the first part of the input memory address can be made smaller, allowing the second part of the input memory address to be larger. This can allow a greater number of arbitrary address locations to be accessed.

The memory access unit may further comprise a plurality of configuration registers; the configuration address may point to one of the configuration registers; and that one of the configuration registers contains the starting address and the item width.

Storing the starting address and item width in a configuration register can allow fast access to this information, without including it in the input memory address.

The address interpreter may be configured to retrieve the starting address and the item width from the configuration register to which the configuration address points.

In some embodiments, the configuration address may be an address in the physical memory; and the starting address and the item width may be stored in the physical memory at the configuration address.

Storing the starting address and item width in the memory, instead of in configuration registers can allow a greater number of blocks of memory to be accessed using the memory access unit. Typically, each block of memory to be accessed may have a different starting address and/or item width. The number of configuration registers in the memory access unit will typically be more limited than the size of the memory.

The memory access unit may be configured to retrieve the starting address and the item width from the physical memory at the configuration address.

Optionally, the memory access unit further comprises a configuration cache, for storing a set of recently used starting addresses and item widths.

Such a system can allow recently used configuration information (that is, starting addresses and item widths) to be accessed quickly, while avoiding a limitation on the number of blocks of memory that can be accessed using the memory access unit.

The memory access unit may be configured to determine whether the starting address and the item width are stored in the configuration cache; if so, retrieve the starting address and the item width from the configuration cache; and if not, retrieve the starting address and the item width from the physical memory at the configuration address.

The address interpreter may be adapted to detect that the input memory address lies within a predetermined range of addresses and, in response, use the input memory address as the physical memory address.

By setting the physical memory address equal to the input memory address, the memory access unit can implement a pass-through function, wherein it is invisible to the device supplying the input memory address. This allows the device to access memory addresses within the predetermined range directly.

Memory addresses in a second predetermined range can be processed by the memory access unit as already summarized above.

The memory access unit may further comprise a data cache, for storing a set of recently accessed data words.

The use of a data cache can speed up access to items in memory, by avoiding the access of the memory each time a processor wishes to access an item, if the item is already in the data cache.

In a memory access unit as summarized above, the first number of bits may be less than the second number of bits.

The memory access unit can provide the greatest efficiency improvement when the items to be accessed have smaller width than the data words of the memory (compared with a conventional data storage structure which stores each item in a separate memory word).

According to another aspect, there is provided a system comprising:

a memory access unit (10) according to any one of the preceding claims; and a physical memory (40), coupled to the memory access unit.

Optionally, this system may be provided in a single integrated circuit package. This may be a multi-chip package or may contain a single monolithic integrated circuit device.

According to a further aspect, there is provided a system comprising:

a microprocessor;

a memory access unit according to any one of the preceding claims, coupled to the microprocessor; and a physical memory, coupled to the memory access unit.

The microprocessor may be a microprocessor core and the memory access unit may be a hardware block. These may be implemented in the same integrated circuit (that is, fabricated in a single, monolithic semiconductor device).

Optionally, the microprocessor, the memory access unit, and the physical memory may be coupled to one another via a multi-layer data communications bus.

BRIEF DESCRIPTION OF THE FIGURES

Examples embodiments will now be described in detail, with reference to the accompanying drawings.

DETAILED DESCRIPTION

Embodiments provide a memory access unit, for providing read- and write-access to an item at an arbitrary location in a physical memory, independently of addressable locations of that physical memory. This allows efficient storage and retrieval of data of any bit-width, in a way that is fully transparent for a processor wishing to access the data, as well as for software running on that processor. In the examples described below, it is assumed that the physical memory ("memory", for short) has a native 32-bit memory width, but those skilled in the art will understand that the scope is not limited to this example. The examples below can be extended to other memory widths, including but not limited to 8, 16, or 64 bits.

Figure 1:
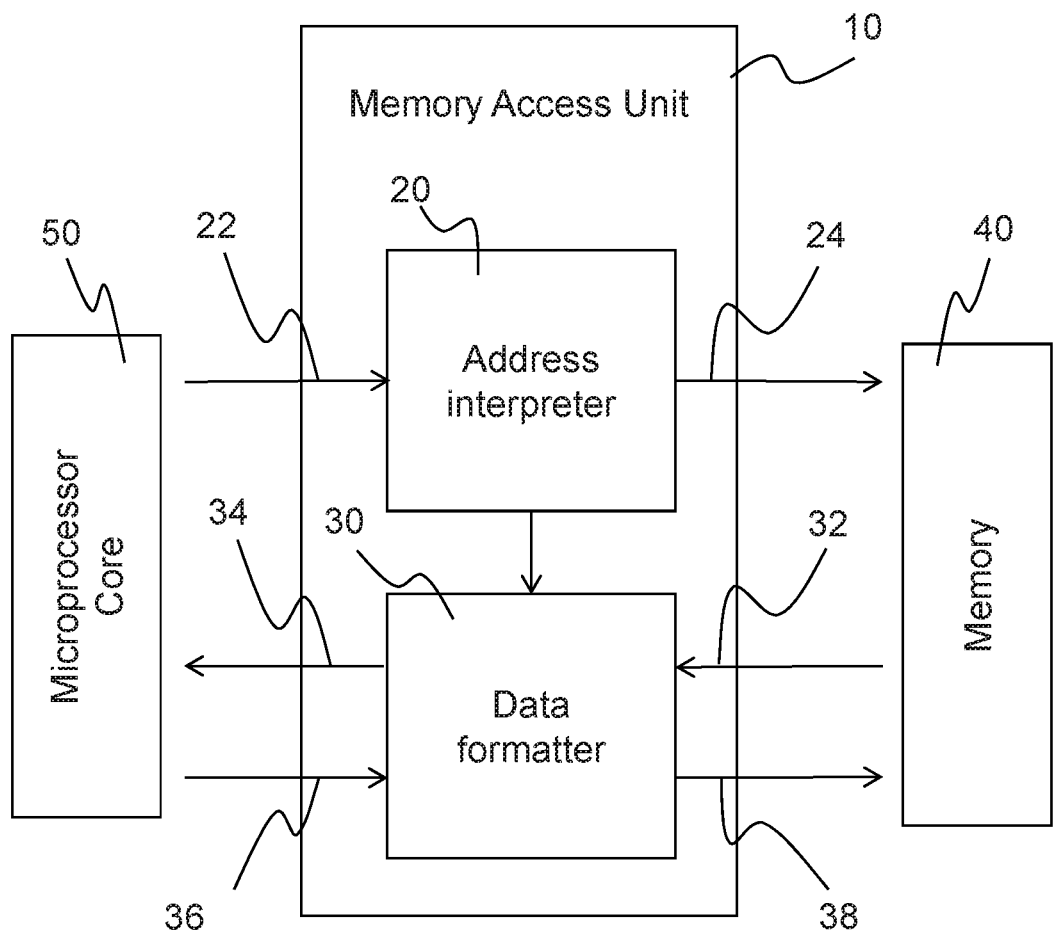
FIG. 1 shows a block diagram of a memory access unit, according to example embodiments.

Typically, a microprocessor wants to access a stream of data not only strictly sequentially but also to have the possibility to access it randomly, with random locations being accessed in a random order. This is possible in the system shown in FIG. 1, where a memory access unit 10 is placed between a microprocessor core 50 and a memory 40. The memory access unit comprises an address interpreter 20 and a data formatter 30. An address input 22 of the address interpreter 20 is coupled to the microprocessor core 50, for receiving an input memory address identifying the location of the item to be accessed. An address output 24 of the address interpreter 20 is coupled to the memory 40, for supplying the physical memory address to an address-input of the memory.

A memory input 32 of the data formatter is coupled to the memory 40, for reading data words from the physical memory. The one or more data words will include the item to be accessed.

For read-access, the data formatter 30 extracts the item from the one or more data words. A data output 34 of the data formatter 30 is coupled to the microprocessor core 50, for outputting the extracted item to the microprocessor core. For write-access, a data input 36 of the data formatter 30 is coupled to the microprocessor core, for receiving the item to be written to the memory 40. The data formatter inserts the item in the one or more data words. A memory output 38 of the data formatter 30 is coupled to the memory 40 for writing the one or more data words to the memory 40, when a write-access is performed.

The address interpreter 20 obtains a starting address in the physical memory 40 and an item width, by interpreting a first part of the input memory address. It also obtains an item number, by interpreting a second part of the input memory address. It then calculates the physical memory address—being the address of the data word in the memory that contains the item (or at least the first portion of the item). The address interpreter 20 calculates the physical memory address based on the starting address, the item number, and the item width. If the item is spread across two consecutive data words in the memory 40, then two physical memory addresses may be calculated.

The data formatter 30 calculates the position of the item within the data word (or words), according to the item number and the item width. It then extracts the item from the data word(s), starting at the calculated position.

Figure 2:
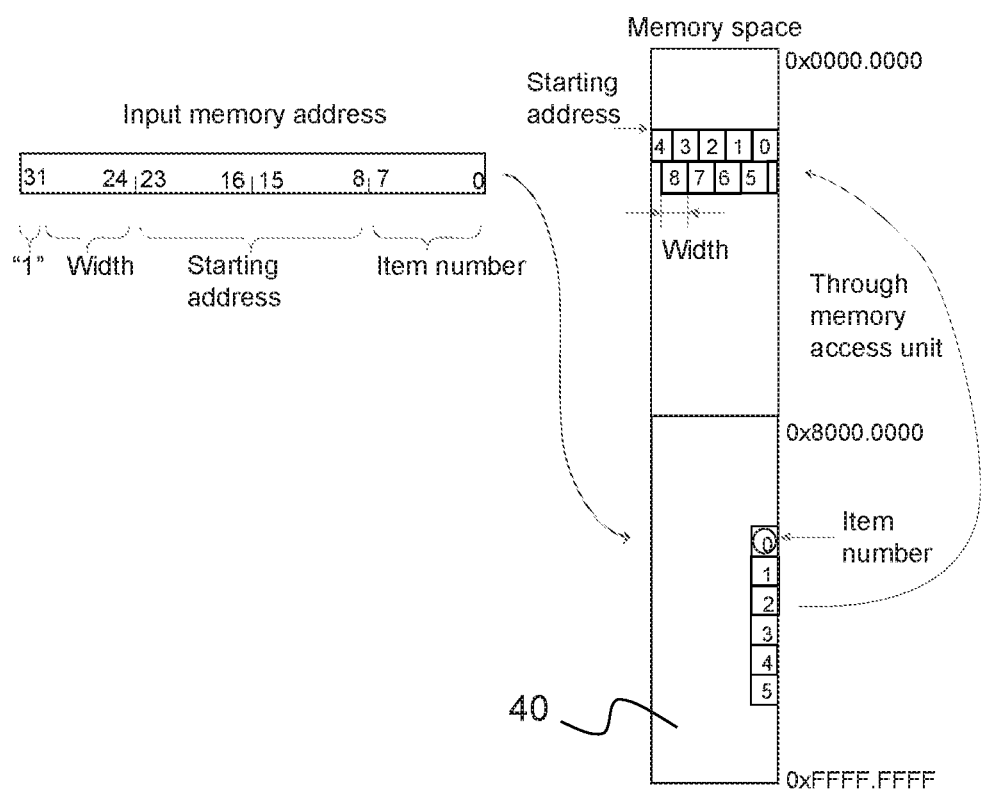
FIG. 2 illustrates a memory access using the embodiment of FIG. 1, according to example embodiments.

In greater detail, as illustrated in FIG. 2: when the read or write action is to a memory location in the range between 0x8000.0000 and 0xFFFF.FFFF, the memory access unit uses some of the address bits of the input memory address to translate this address to a physical memory address and item number within a compacted block in the physical memory range. That is, an input memory address in the range 0x8000.0000 to 0xFFFF.FFFF is translated to a physical memory address in the range 0x0000.0000 and 0x0000.FFFF.

After calculating the physical memory address and item number the memory access unit 10 performs the reading, bit-shifting and optionally also modifying and writing autonomously, as requested by the microprocessor core 50. In the example illustrated in FIG. 2, bits 0-7 of the input address generated by the microprocessor core 50 indicate the item number in the compacted array. Bits 8-23 indicate the starting address ("base address") of the compacted block in the physical memory 40. Meanwhile, bits 24-29 indicate the sample width of each item in the compacted data stream. It is assumed that the items have uniform size.

The calculation of the physical memory address and position of the item for a particular item at an arbitrary location will now be described in detail in the following steps.

Step 1: Calculate the bit-address of the item: BIT_ADDRESS=ItemNumber*ItemWidth. Here, BIT_ADDRESS is the address of the requested item, expressed in bits and excluding the StartAddress.

Step 2: Calculate the word address of the item: WORD_ADDRESS=StartAddress+BIT_ADDRESS/MemoryWidth. Here, WORD_ADDRESS is the physical memory address—the addressable memory location that contains at least the first bit of the requested item. Some bits of the requested item may be contained in the subsequent memory address. MemoryWidth is the memory width—which is 32, in the present example.

Step 3: Calculate the bit-offset of the item: BIT_OFFSET=BIT_ADDRESS % MemoryWidth. Here, BIT_OFFSET is the bit number (within the addressable memory word) that contains the first bit of the requested item—that is, the position of the item in the data word. Here, "%" means the modulo operator. For example, 29%32=29, 30%32=30, 31%32=31, 32%32=0, 33%32=1, etc.

In almost all practical implementations, MemoryWidth is a power of 2 (for example: 8, 16, 32, or 64); therefore, the division operation in step 2 and the modulo operation in step 3 can be implemented by bit-shifting operations. In step 2, the division operation "/" can be implemented by keeping the most significant bits of BIT_ADDRESS and discarding the least significant bits. This is equivalent to truncating the result of the division to the nearest lower integer. For example, if MemoryWidth=32, the division operation can be implemented by discarding the 5 least significant bits, since 32=25. In step 3, the modulo operation "%" can be implemented by keeping the least significant bits and discarding the most significant bits. If MemoryWidth=32, the modulo operation can be implemented by keeping the 5 least significant bits. In other words, BIT_OFFSET is the remainder after dividing BIT_ADDRESS by MemoryWidth. This means that WORD_ADDRESS can be calculated by adding to StartAddress the most significant bits of BIT_ADDRESS (discarding the 5 least significant bits); and BIT_OFFSET is given by the 5 least significant bits of BIT_ADDRESS.

Note that it is not necessary to start the compacted stream of data on bit 0 of StartAddress: It is easy to add an offset to the BIT_ADDRESS in step 1. In this way, the very first item of the stream could start (for example) at bit 10 of the StartAddress, instead of always at bit 0.

In the example of FIG. 2 the memory access unit 10 is configured such that any read or write access from the microprocessor core 50 to the memory 40 in a certain address range of the memory (in this example between 0x0000.0000 and 0x0000.FFFF) is passed through directly to the memory. This allows the microprocessor core to access the memory normally when no compaction of the data in the memory occurs. This feature may be used, for example, to read and execute a software program that is stored in the memory 40.

The memory access unit 10 described above with reference to FIG. 2 obtains the information used to calculate the physical memory address and the item position directly from the 32-bit address supplied by the microprocessor core 50. The 32-bit address contains the item number, starting address, and item width. This has the limitation that this information can be only 31 bits wide. (For reasons that will be explained below, the MSB is used as a flag, which indicates to the memory access unit 10 that a compacted stream is being accessed.) In the example bit assignment shown in FIG. 2, the addressable physical memory where the compacted stream of data items is stored can be a maximum of 64 Kbytes in size, and the maximum number of items in one compacted stream is 256.

Instead of including all of the information directly in the 32-bit address, the memory access unit 20 can comprise a configuration register that stores part of the information. For example, the configuration register may store the bits that encode the item width and/or the bits that encode the starting address, so that only the item number is encoded in the address bits. The configuration register can be configured by the microprocessor core 50 before the microprocessor uses the memory access unit 10 to read from or write to a compacted memory stream.

Figure 3:
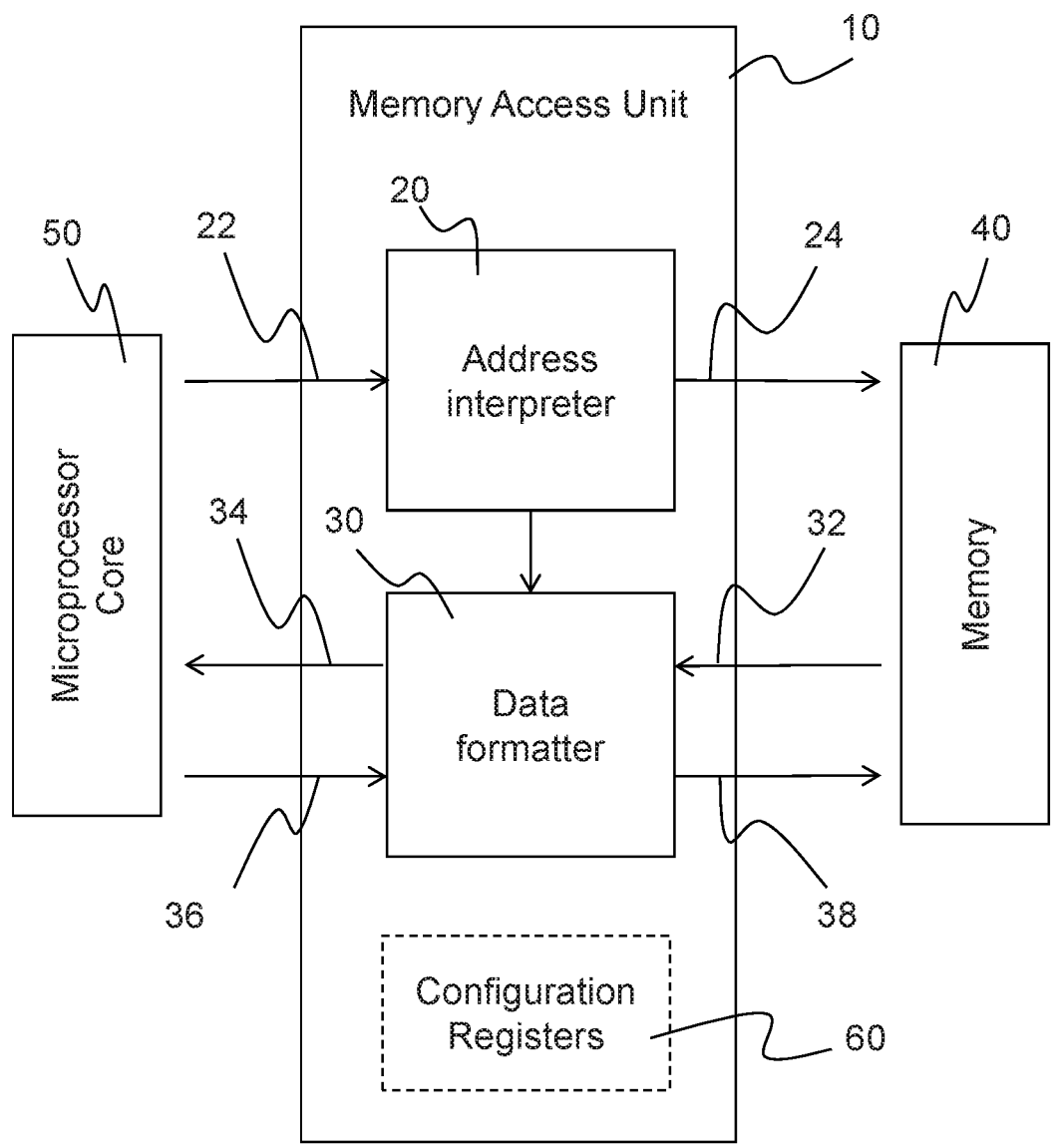
FIG. 3 shows a block diagram of a memory access unit, according to example embodiments that use configuration registers.

If the memory access unit has a single configuration register, then the configuration register may be updated each time that a different compacted stream is accessed. This may be undesirable in multi-processor systems, where different processors may want to access different compacted data streams concurrently. To mitigate this difficulty, a memory access unit can be provided with multiple configuration registers 60 and each of these can be configured to point to a different compacted stream. Such an embodiment is illustrated in FIG. 3. In this embodiment, the selection of which configuration register to use is encoded in the input memory address. For example, if there are 16 configuration registers and a 32-bit address space this would take 4 bits, which leaves 32−1−4=27 bits for the item number. This is a significant improvement over the embodiment of FIG. 2.

Storing configuration information in multiple configuration registers, as in FIG. 3, may permit only a limited number of streams to be accessed at the same time. The maximum number of streams is determined by the number of available configuration registers 60. If more streams are accessed than the number of configuration registers, then at least some of the configuration registers may be re-programmed. This may be complicated in multi-processor systems, in which several different processors may attempt to access different compacted data streams concurrently. Meanwhile, increasing the number of configuration registers (for example, to 256, 512, or 1024 configuration registers) may occupy an increasing area of the semiconductor chip. This can be costly.

Figure 4:
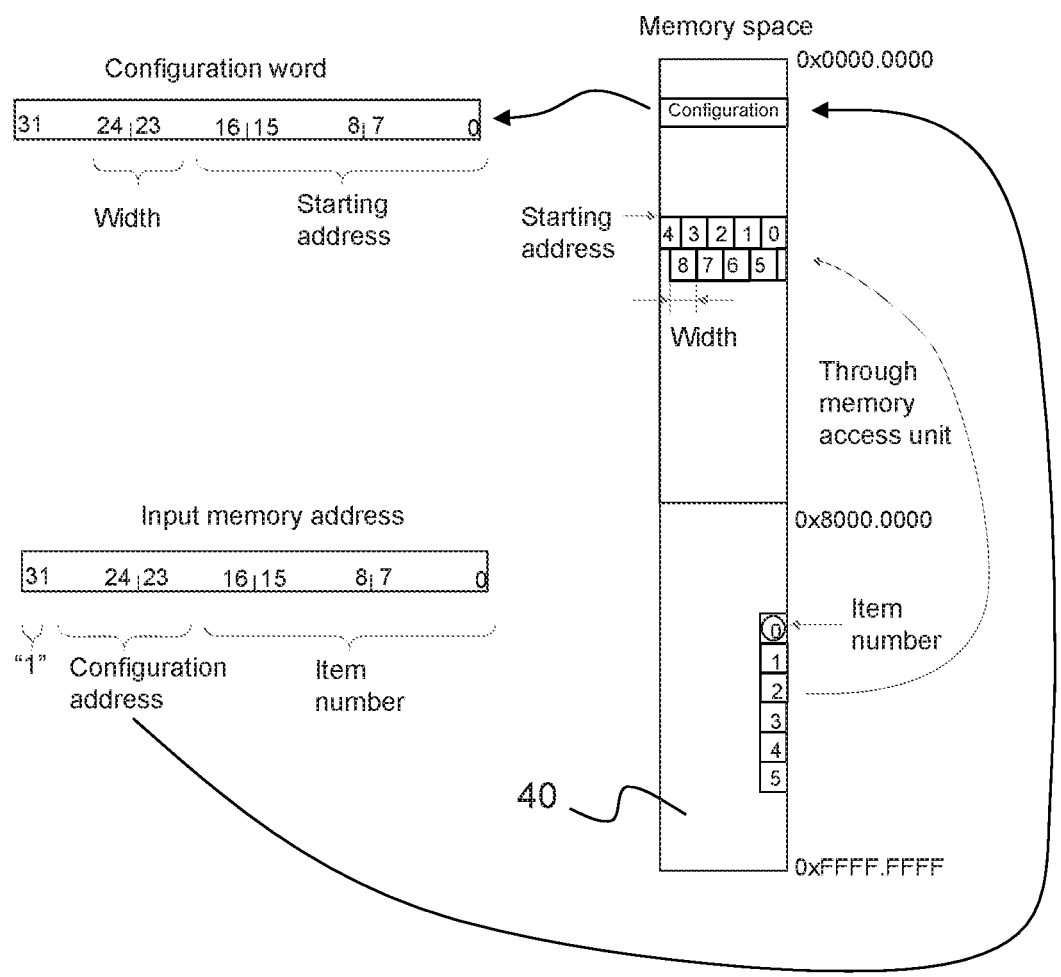
FIG. 4 illustrates a memory access unit, according to example embodiments that store configuration information in memory.

One alternative is to store the configuration words in the memory 40, and to encode the physical address of the configuration word in the input memory address. An example of such an alternative is illustrated in FIG. 4, using a 32-bit input memory address. With this approach, the configuration registers 60 of FIG. 3 can be eliminated; therefore, the example in FIG. 4 can be implemented with the hardware block diagram of FIG. 1.

The embodiment of FIG. 4 is different from the one illustrated in FIG. 2, because the item width of the stream (and optionally also other information) does not need to be encoded in the 32-bit input memory address. The physical address range where the configuration words are stored in the memory 40 does not need to be very large. In this example, only the address range between 0x0000.0000 and 0x0000.0200 is used. This means that the configuration address may use only 9 bits, leaving more bits to encode the item number in the 32-bit input memory address.

In the embodiment of FIG. 4, each time that the microprocessor core 50 wants to access a compacted stream of data, the memory access unit may first read the relevant configuration word from memory. Only after that can the compacted stream be read from or written to physical memory 40. This means that, for each item that is read from the compacted stream, at least two memory accesses may be used—a first read-access to read the configuration word, and then a second read-access to read the actual item. If the compacted item happens to be distributed over two consecutive data words in the physical memory 40 (for example, as shown for item #4 in FIG. 4), then three memory accesses may be used.

For writing an item to a compacted stream, at least three memory access may be used—a first read-access to read the configuration word, a second read-access to read the data word containing the item location, and then a write-access to write back the modified data word, containing the item. If the item happens to be distributed over two consecutive physical addresses (data words), then five memory access may be used.

Figure 5:
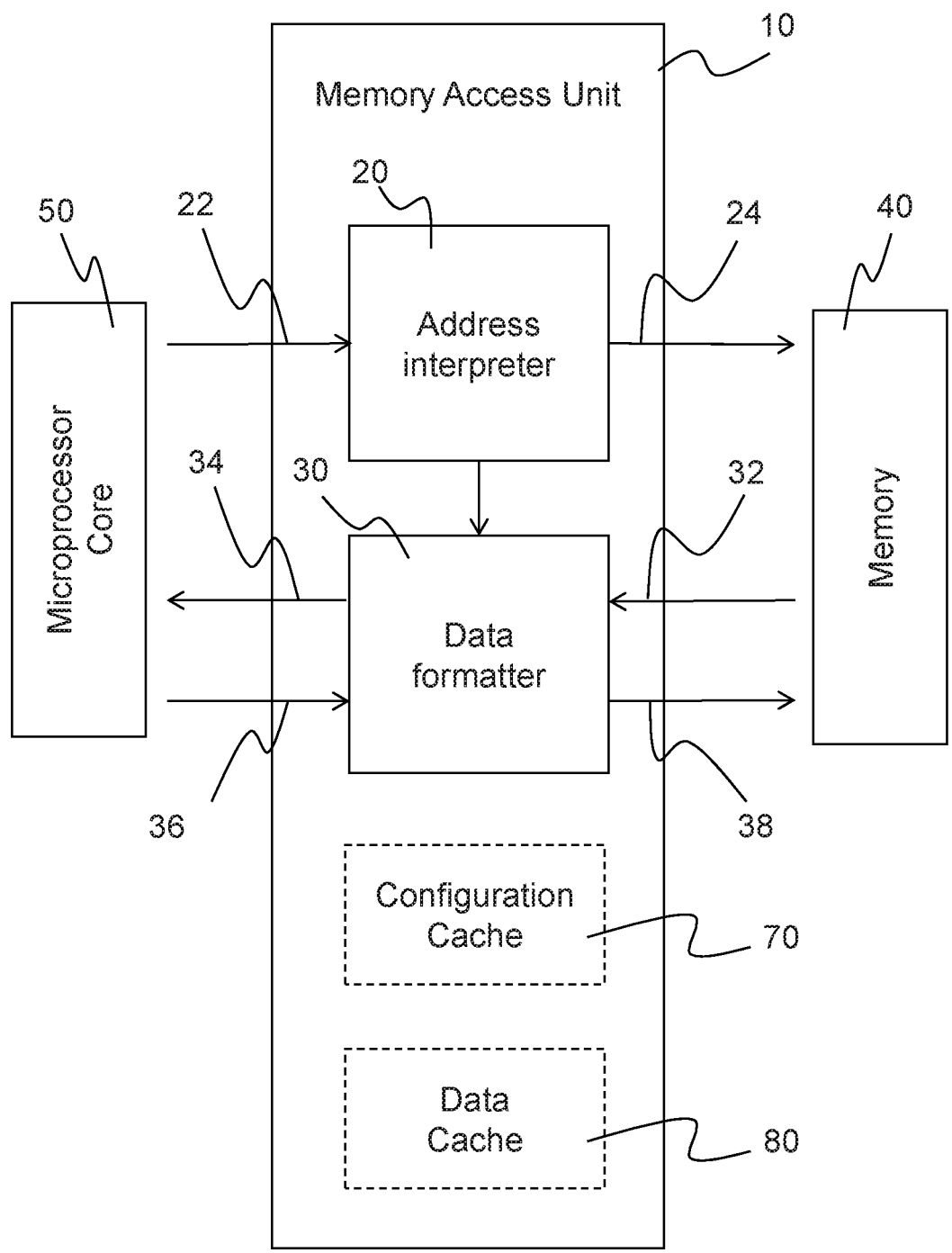
FIG. 5 illustrates a memory access unit according to a modified version of the embodiment of FIG. 4, which uses caches to temporarily store data and configuration information.

In order to speed up the read and write processes, caches can be used. An embodiment which includes a configuration cache 70 and a data cache 80 is illustrated in FIG. 5.

Firstly, the cache 70 for configuration words will be described. The configuration cache 70 is adapted to store the last X most recently used configuration words. Here, X is an integer, which can be from 1 to 16, for example. If the microprocessor core 50 accesses one of the X most recently access compacted streams, then the configuration word for that stream can be found in the cache 70, and therefore may not be retrieved from the physical memory 50. This speeds up access to items in a compacted stream.

The difference between the configuration cache 70 and having multiple configuration registers 60 (FIG. 3) is that the cache 70 can be smaller than the number of compacted streams that are accessed simultaneously. However, there will be a small performance penalty, when each stream is accessed for the first time, or for the first time after its configuration information has been deleted from the cache. The administration of the configuration words that are stored in the cache 70 can be done automatically and locally by the memory access unit 10, which avoids problems that might arise when multiple processors are attempting to access multiple compacted streams concurrently.

In a typical application, much of the time (but not always), the data in a compacted stream is not accessed in a random order but accessed more or less sequentially. For example, if the microprocessor core 50 is calculating the output of a Finite Impulse Response (FIR) filter with different coefficients for every item in the stream, it will typically access the items in the stream sequentially. For this reason, a data cache 80 can also help to reduce the number of memory transfers that occur between the memory access unit 10 and the memory 40.

Figure 6:
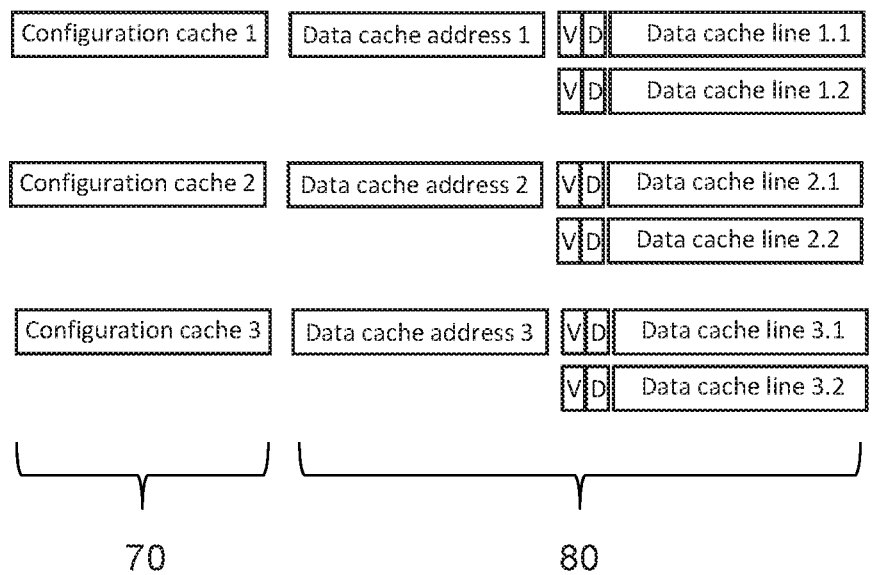
FIG. 6 illustrates the operation of a configuration cache and a data cache according to example embodiments.

In one example, for every line (word) in the configuration cache 70, there are also two lines in the data cache 80. This is illustrated in FIG. 6. The very first time an item in a stream is read, the data cache for that stream may be filled. This may include two memory read accesses (excluding the read-access to read the configuration information). After that, depending on the bit-width of the items in the compacted stream, multiple items may be contained in the cache already. If the microprocessor core 50 attempts to read the next item in the compacted stream, there is a high chance that this item is already in the cache and no memory access will be used to retrieve the item.

For writing, the data cache 80 offers a potentially even larger performance improvement, because the data can be modified directly in the cache. While the microprocessor core 50 is already executing the next instructions, the memory access unit 10 then has still time to update the physical memory content according to the dirty cache lines. (Here "dirty" refers to a cache line that has been modified in the cache, and this modification has not yet been written to the physical memory 50.) In this example, the data cache has two lines, on the assumption that a compacted data element can be distributed over two consecutive data words in the physical memory 40.

In FIG. 6, three configuration cache lines are shown, labeled Configuration cache 1, 2 and 3. Each configuration cache line also has an associated data cache of two lines, labeled Data cache line x.1 and Data cache line x.2. Each data cache line has a bit flag "V" that indicates whether the data in that cache line is valid (that is, has already been read from memory) and a bit flag "D" that indicated whether the data in the cache line is dirty (that is, has been modified but not yet written to memory). The address that is being cached in the data cache lines is stored in the respective Data cache address 1, 2, and 3. Slightly different possible implementations (with slightly lower performance) include having only one "valid" flag for both of the data cache lines belonging to each configuration cache, which means that both cache lines may be retrieved. Alternatively or in addition, it may be possible to provide just one "dirty" flag for both data cache lines belonging to each configuration cache, which means that both cache lines may be written to memory, even if only one is dirty.

As mentioned above, in FIG. 6, every data cache line has its own "valid" flag. This is potentially beneficial because, when the item requested by the microprocessor core 50 is contained wholly in a single data word of the physical memory 40 (as the case, for example, for items 0, 1, 2, 3, 5, 6, 7, and 8 in FIG. 4), then initially only a single data word may be read from the physical memory 40. The item can then already be returned by the memory access unit 10 to the microprocessor core 50, either during or before the retrieval of the second cache line from the memory 40. As a result, the microprocessor can start executing the next instruction earlier, while the memory access unit 10 can then retrieve the second cache line from memory in the "background". This improves the performance of the system.

As mentioned earlier above, the microprocessor core 50 will often read from the compacted stream in sequential manner. That means that when the microprocessor core 50 reads an item that is contained in (or at least starts in) the second data cache line, it is very likely that it will not access the items in the first data cache line. To take advantage of this, when the memory access unit 10 determines that the items contained in the second cache line are being accessed, it can (in the back ground) move the content of the second cache line to the first cache line, and after that fill the second cache line with the subsequent data word retrieved from memory. It can do this even before the microprocessor core 50 attempts to access the items in this subsequent data word. In this way, it is possible to avoid any performance penalty when accessing a compacted stream in a sequential manner. This further improves the performance of the system.

Figure 7:
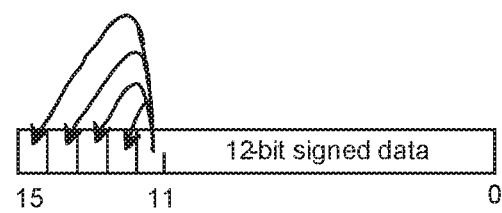
FIG. 7 illustrates sign-extension of a 12-data item to 16-bits according to example embodiments.

In many cases, the data items stored in the compacted memory will comprise signed data, wherein positive numbers as well as negative numbers can be stored. A common way to represent negative numbers is using so-called two's-complement notation. However, when data is retrieved from a compacted data stream using a memory access unit according to an embodiment, the data item may have a width that is narrower than the data width expected by the microprocessor core 50. For example, each retrieved item may be 7 or 12 bits wide. Without any additional processing, this data item would not conform to two's-complement arithmetic on an 8-, 16-, or 32-bit microprocessor 50. To provide the item in the correct format and width expected by the microprocessor core 50, sign-extension may be used. This means that the memory access unit 10 copies the value contained in the most significant bit of the data into the "unused" bits of the 8-, 16-, or 32-bit wide word to be output to the microprocessor core 50. This process is illustrated in FIG. 7. The effect of sign-extension (or failing to perform sign-extension) is shown in the table below. As shown in the first three rows of the table, the binary representations of −2048, −2, and −1 will be misinterpreted as 2048, 4094, and 4095, respectively, without sign-extension.

| 12-bit binary 2's-complement | 12-bit decimal | 16-bit binary No sign-extension | 16-bit decimal No sign-extension | 16-bit binary With sign-extension | 16-bit decimal With sign-extension |
|---|---|---|---|---|---|
| 1000.0000.0000 | −2048 | 0000.1000.0000.0000 | 2048 | 1111.1000.0000.0000 | −2048 |
| 1111.1111.1110 | −2 | 0000.1111.1111.1110 | 4094 | 1111.1111.1111.1110 | −2 |
| 1111.1111.1111 | −1 | 0000.1111.1111.1111 | 4095 | 1111.1111.1111.1111 | −1 |
| 0000.0000.0000 | 0 | 0000.0000.0000.0000 | 0 | 0000.0000.0000.0000 | 0 |
| 0000.0000.0001 | 1 | 0000.0000.0000.0001 | 1 | 0000.0000.0000.0001 | 1 |
| 0000.0000.0010 | 2 | 0000.0000.0000.0010 | 2 | 0000.0000.0000.0010 | 2 |
| 0111.1111.1111 | 2047 | 0000.0111.1111.1111 | 2047 | 0000.0111.1111.1111 | 2047 |

The sign-extension functionality can be implemented in the memory access unit 10. Optionally, the sign-extension functionality can be enabled or disabled. The setting for enabling or disabling the sign-extension functionality for a particular compacted data stream can be stored in the configuration word of that stream. Alternatively, the enabling and disabling of sign-extension can be switched on and off universally for all streams.

Various modifications are possible to the embodiments described above. In the embodiments pictured in FIGS. 1, 3, and 5, the memory access unit 10 is placed between the microprocessor core 50 and the memory 40, and is directly coupled to each. However, in some advanced microprocessor systems a multi-layer bus is used for communication between the various blocks in the system. An example of this type of architecture is the Advanced High-performance Bus (AHB), a protocol introduced in Advanced Microcontroller Bus Architecture version 2 published by ARM Ltd.

Figure 8:
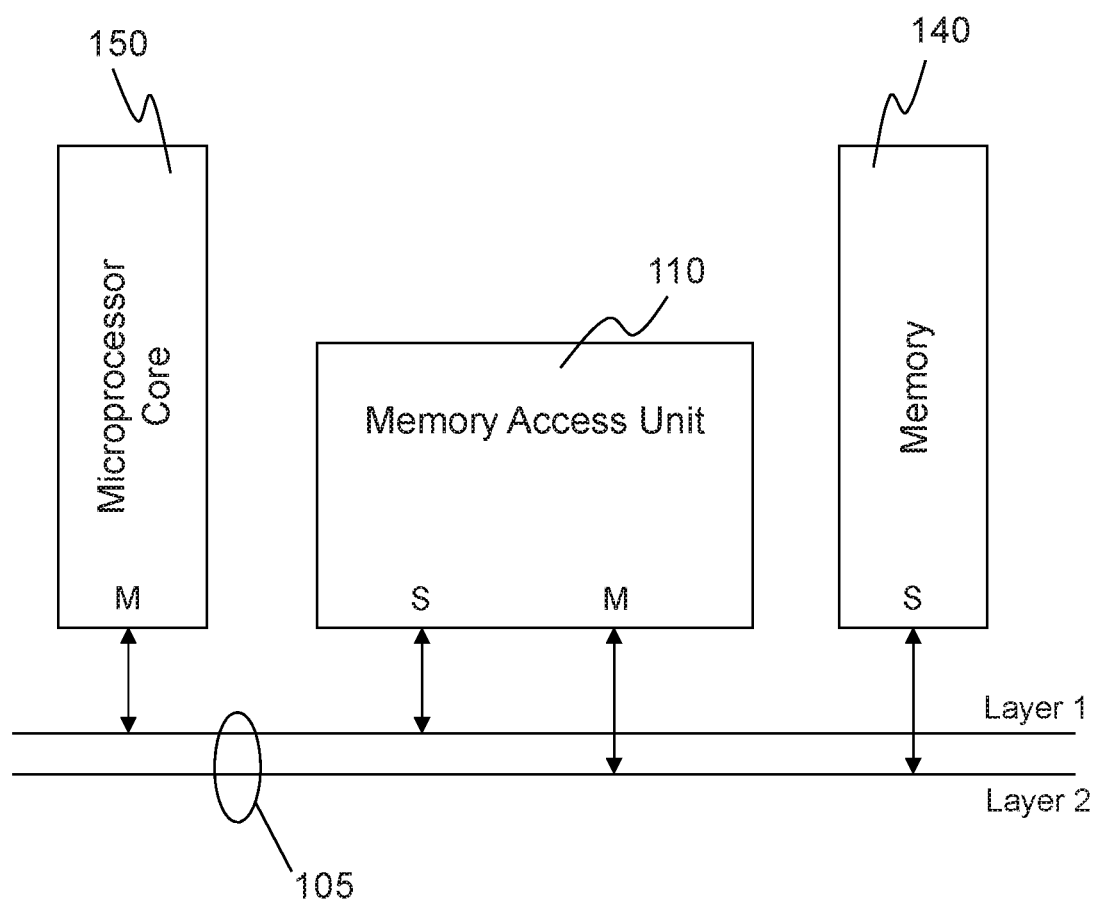
FIG. 8 is a block diagram of an alternative system architecture, according to example embodiments.

Some embodiments can be implemented in the context of this type of architecture. The block diagram of FIGS. 1, 3, and 5 can be replaced by the block diagram shown in FIG. 8. In FIG. 8, the memory access unit 110 is a unit that acts as an AHB-slave (S) as well as an AHB-master (M) on the multilayer AHB bus 105. When the microprocessor core 150 wants to access a memory address in the range of 0x0000.0000-0x0000.FFFF, the multi-layer AHB bus 105 couples the microprocessor core 150 (master) directly to the memory 140 (slave) via one of the two layers of the AHB-bus 105. In this case, the memory access unit 110 is inactive.

When the microprocessor core 150 wants to access a memory address in the range 0x8000.0000-0xFFFF.FFFF, the multi-layer AHB bus 105 couples the microprocessor core 150 (master) to the slave interface of the memory access unit (for example, via Layer 1 of the bus 105). The memory access unit 110 messages the microprocessor core 150 to wait and, in the meantime, communicates to the memory 140 via the AHB master interface of the memory access unit 110 (for example, via Layer 2). This is the situation illustrated in FIG. 8. After the memory access unit 110 has finished its operations with the memory 140, it instructs the microprocessor core 150 that it can continue execution again, and—in the case of a read-access—also returns the item that it has retrieved from the memory.

Memory access units according to various embodiments can be embedded in most microcontroller or microprocessor architectures, to allow efficient storage and retrieval of data of any bit-width, in a manner that is fully transparent for the hardware and software of the microprocessor.

Various other modifications will be apparent to those skilled in the art.

What is claimed is:

1. A memory access unit circuit for providing read-access to read an item from an arbitrary location in a physical memory,
    wherein the item comprises a first number of bits and each addressable location of the physical memory comprises a second number of bits, the second number of bits being different from the first number of bits,
    the memory access unit circuit comprising:
        an address input for receiving an input memory address identifying a location of the item;
        an address interpreter circuit, configured to calculate a physical memory address from the input memory address;
        an address output for supplying the physical memory address to an address-input of the physical memory;
        a memory input for reading one or more data words from the physical memory, wherein the one or more data words comprise the item;
        a data formatter circuit, configured to extract the item from the one or more data words; and
        a data output for outputting the extracted item,
    wherein the address interpreter circuit is configured to calculate the physical memory address from the input memory address by:
        obtaining a starting address in the physical memory and an item width, wherein obtaining the starting address in the physical memory and the item width comprises interpreting a first part of the input memory address;
        obtaining an item number, wherein obtaining the item number comprises interpreting a second part of the input memory address; and
        calculating the physical memory address, based on the starting address, the item number, and the item width, and
    wherein the data formatter circuit is configured to:
        calculate a position of the item within the one or more data words, based on the item number and the item width; and
        extract the item from the one or more data words at the calculated position,
    wherein bits 0-7 of the input memory address indicate the item number, and
    wherein a microprocessor, the memory access unit circuit, and the physical memory are each separate components and are coupled to one another via a multi-layer data communications bus.

2. The memory access unit circuit of claim 1,
    wherein the data output comprises a third number of bits that is greater than the first number of bits,
    wherein, when indicated by a setting for enabling and disabling a sign-extension functionality stored within a configuration word, the data formatter circuit is configured to:

set a first number of least significant bits of the data output equal to the extracted item; and
set remaining bits of the data output equal to a most significant bit of the extracted item.

3. The memory access unit circuit of claim 1,
wherein the address interpreter circuit is configured to:
detect that the item is located partly in a first data word of the physical memory and partly in a consecutive second data word of the physical memory;
calculate a first physical memory address, being an address of the first data word, and
calculate a second physical memory address, being an address of the second data word,
wherein the memory access unit circuit is configured to:
supply the first physical memory address to the physical memory via the address output;
read the first data word via the memory input;
supply the second physical memory address to the physical memory via the address output; and
read the second data word via the memory input.

4. A memory access unit circuit for providing write-access to write an item at an arbitrary location in a physical memory,
wherein the item comprises a first number of bits and each addressable location of the physical memory comprises a second number of bits, the second number of bits being different from the first number of bits,
the memory access unit circuit comprising:
an address input for receiving an input memory address identifying a location of the item;
an address interpreter circuit, configured to calculate a physical memory address from the input memory address;
an address output for supplying the physical memory address to an address-input of the physical memory;
a data input for receiving the item to be written;
a data formatter circuit, configured to insert the item in one or more data words suitable for writing to the physical memory; and
a memory output, configured to write the one or more data words to the physical memory,
wherein the address interpreter circuit is configured to calculate the physical memory address from the input memory address by:
obtaining a starting address in the physical memory and an item width, wherein obtaining the starting address in the physical memory and the item width comprises interpreting a first part of the input memory address;
obtaining an item number, wherein obtaining the item number comprises interpreting a second part of the input memory address; and
calculating the physical memory address, based on the starting address, the item number, and the item width, and
wherein the data formatter circuit is configured to:
calculate a position of the item within the one or more data words, based on the item number and the item width; and
insert the item into the one or more data words at the calculated position,
wherein bits 0-7 of the input memory address indicate the item number, and
wherein a microprocessor, the memory access unit circuit, and the physical memory are each separate components and are coupled to one another via a multi-layer data communications bus.

5. The memory access unit circuit of claim 4, further comprising a memory input for reading one or more data words from the physical memory.

6. A system comprising:
a memory access unit circuit for providing read-access to read an item from an arbitrary location in a physical memory,
wherein the item comprises a first number of bits and each addressable location of the physical memory comprises a second number of bits, the second number of bits being different from the first number of bits,
the memory access unit circuit comprising:
an address input for receiving an input memory address identifying a location of the item;
an address interpreter circuit, configured to calculate a physical memory address from the input memory address;
an address output for supplying the physical memory address to an address-input of the physical memory;
a memory input for reading one or more data words from the physical memory, wherein the one or more data words comprise the item;
a data formatter circuit, configured to extract the item from the one or more data words; and
a data output for outputting the extracted item,
wherein the address interpreter circuit is configured to calculate the physical memory address from the input memory address by:
obtaining a starting address in the physical memory and an item width, wherein obtaining the starting address in the physical memory and the item width comprises interpreting a first part of the input memory address;
obtaining an item number, wherein obtaining the item number comprises interpreting a second part of the input memory address; and
calculating the physical memory address, based on the starting address, the item number, and the item width, and
wherein the data formatter circuit is configured to:
calculate a position of the item within the one or more data words, based on the item number and the item width; and
extract the item from the one or more data words at the calculated position; and
a microprocessor,
wherein bits 0-7 of the input memory address indicate the item number, and
wherein the microprocessor, the memory access unit circuit, and the physical memory are each separate components and are coupled to one another via a multi-layer data communications bus.

7. The system of claim 6,
wherein the data output comprises a third number of bits that is greater than the first number of bits, and
wherein, when indicated by a setting for enabling and disabling a sign-extension functionality stored within a configuration word, the data formatter circuit is configured to:
set a first number of least significant bits of the data output equal to the extracted item; and
set remaining bits of the data output equal to a most significant bit of the extracted item.

8. The system of claim 6,
wherein the address interpreter circuit is configured to:
  detect that the item is located partly in a first data word of the physical memory and partly in a consecutive second data word of the physical memory;
  calculate a first physical memory address, being an address of the first data word; and
  calculate a second physical memory address, being an address of the second data word,
wherein the memory access unit circuit is configured to:
  supply the first physical memory address to the physical memory via the address output;
  read the first data word via the memory input;
  supply the second physical memory address to the physical memory via the address output; and
  read the second data word via the memory input.

9. The memory access unit circuit of claim 1, wherein the data output is configured to pad the extracted item with additional bits prior to outputting the extracted item.

10. The memory access unit circuit of claim 1, wherein the address interpreter circuit is further configured to calculate the physical memory address from the input memory address by:
  determining whether the starting address and the item width are stored in a configuration cache; and
  (i) retrieving the starting address and the item width from the configuration cache if the starting address and the item width are stored in the configuration cache; or (ii) retrieving the starting address and the item width from the physical memory at a configuration address if the starting address and the item width are not stored in the configuration cache.

11. The memory access unit circuit of claim 1, wherein the memory access unit circuit comprises a hardware block.

12. The memory access unit circuit of claim 1, wherein bits 8-23 of the input memory address indicate the starting address.

13. The memory access unit circuit of claim 1, wherein bits 24-29 of the input memory address indicate the item width.

14. The memory access unit circuit of claim 1, wherein a most-significant bit of the input memory address comprises a flag that indicates that a compacted stream is being accessed.

15. The memory access unit circuit of claim 1, wherein the item width is 7 bits or 12 bits.

16. The memory access unit circuit of claim 1,
wherein the multi-layer data communications bus couples the microprocessor to the physical memory when the physical memory address is between 0x0000.0000 and 0x0000.FFFF, and
wherein the multi-layer data communications bus couples the microprocessor to the memory access unit circuit when the physical memory address is between 0x8000.0000 and 0xFFFF.FFFF.

17. The memory access unit circuit of claim 4, wherein the memory output is configured to discard selected bits of the item prior to writing the one or more data words to the physical memory.

* * * * *